(12) United States Patent
Schulte-Wieking

(10) Patent No.: US 7,990,593 B2
(45) Date of Patent: Aug. 2, 2011

(54) HOLOGRAPHIC STORAGE MATERIAL

(75) Inventor: Kay Schulte-Wieking, Heidelberg (DE)

(73) Assignee: Tesa Scribos GmbH, Heidelberg (DE)

( * ) Notice: Subject to any disclaimer, the term of this patent is extended or adjusted under 35 U.S.C. 154(b) by 405 days.

(21) Appl. No.: 12/281,641

(22) PCT Filed: Apr. 2, 2007

(86) PCT No.: PCT/EP2007/002937
§ 371 (c)(1),
(2), (4) Date: Nov. 6, 2008

(87) PCT Pub. No.: WO2007/115719
PCT Pub. Date: Oct. 18, 2007

(65) Prior Publication Data
US 2009/0059327 A1  Mar. 5, 2009

(30) Foreign Application Priority Data

Apr. 4, 2006 (DE) .................. 10 2006 015 593

(51) Int. Cl.
*G03H 1/02* (2006.01)
(52) U.S. Cl. ........................................... 359/3
(58) Field of Classification Search .................. None
See application file for complete search history.

(56) References Cited

U.S. PATENT DOCUMENTS

| 2003/0107709 A1 | 6/2003 | Rodick |
| 2004/0179457 A1 | 9/2004 | Hirao et al. |
| 2004/0233831 A1 | 11/2004 | Matsumoto |
| 2005/0170259 A1* | 8/2005 | Holmes ............................ 430/1 |

FOREIGN PATENT DOCUMENTS

| EP | 1523001 A | 4/2005 |
| WO | 9947983 A1 | 9/1999 |
| WO | 0215179 A | 2/2002 |
| WO | 2004057594 A | 7/2004 |

OTHER PUBLICATIONS

English Language Abstract for WO 02/15179.

* cited by examiner

*Primary Examiner* — Stephone B Allen
*Assistant Examiner* — Derek S Chapel
(74) *Attorney, Agent, or Firm* — Norris, McLaughlin & Marcus, PA; Christa Hildebrand, Esq.

(57) ABSTRACT

The invention relates to holographic storage material (1) comprising at least one polymer film (3) and one metallic first layer (4) which is applied to the polymer film (3). In order to provide a storage material (1) having improved optical properties, a non-metallic second layer (5) and a metallic third layer (6) are provided. The second layer (5) is arranged between the first (4) and the third (6) layers. The total thickness of the first, second and third layers (4,5,6) is less than the wavelength of the radiation used for reading out.

17 Claims, 1 Drawing Sheet

HOLOGRAPHIC STORAGE MATERIAL

This is an application filed under 35 USC §371 of PCT/EP2007/002937, claiming priority under DE 10 2006 015 593.9 filed on Apr. 4, 2006.

BACKGROUND OF THE INVENTION

The present invention relates to a holographic storage material having at least a polymer film and a metallic first layer, wherein the first layer is arranged directly or indirectly on the polymer film.

Holographic storage materials can be such materials to which desired information can be written continuously in the form of a computer-generated hologram. The computer-generated hologram can in this case additionally be continuously readable.

Computer-generated holograms comprise one or more layers of point matrices or point distributions which, in the case of illumination with a preferably coherent light beam, result in a reconstruction of the information which is coded in the hologram. The point distribution can here be calculated as amplitude hologram, phase hologram or as kinoform or from a hybrid form of such types of hologram. In order to produce computer-generated holograms, the latter are first calculated and subsequently written to a storage material using a suitable writing apparatus with the input of energy. The resolution of the resulting point matrix can be within the range of to below 1 µm. It is thus possible to write holograms with a high resolution in a small amount of space, the information of which holograms can be read first by illumination using a light beam and reconstructing the diffraction image. The size of the holograms can in this case be between less than 1 mm$^2$ and several 1 cm$^2$.

The previously described computer-generated holograms can be combined with directly visible information (microscript, microimages).

In addition to computer-generated holograms, the prior art (US 2005/0170259 A1) also discloses embossed holograms. Several embossed holograms can be arranged one on top of the other by way of a multi-layer structure. To this end, it is necessary for the layers to be embossed independently of one another and subsequently be connected to one another. With respect to the respective layers, it is necessary in this security element for them to be sufficiently thick in order to be embossed without the layer being destroyed in the process. As opposed to computer-generated holograms, and owing to the complicated production, embossed holograms cannot be individually designed in series.

A number of writing apparatuses for writing computer-generated holograms are known from the prior art, which write the optical structures of the holograms to planar storage materials. Reference is made here, by way of example, to the documents WO 02/079881, WO 02/079883, WO 02/084404, WO 02/084405 and WO 03/012549.

Likewise known are a number of reading apparatuses which are suitable, by way of illuminating the hologram surface using a light beam and suitable optics, for rendering the reconstruction visible or electronically representable and evaluable by means of recording means. Reference is made here, by way of example, to the documents DE 101 37 832, WO 02/084588 and WO 2005/111913.

Holographic storage materials can be made of a polymer film and a metallic layer whose structure can be influenced in a point-wise manner by way of inputting thermal energy, preferably by means of a focused laser beam.

For the storage material to be effectively writable in the first place, it must have a minimum degree of absorption power. This absorption power is, during the writing process, the triggering factor for the formation of a written point.

The metallic layer has a significant influence on the optical properties, in particular the absorption properties of the storage material. A decisive parameter of the metal layer here is its thickness, since the thickness influences the absorption properties. Consequently, the metallic layer must have a specific thickness in order to ensure sufficient absorption of the radiation which is incident during writing.

In addition to the absorption properties, however, the transmission and reflection also play a role for the properties of the storage material, wherein these further properties are more or less also influenced by the metallic layer. Frequently, a storage material with maximum absorption appears only slightly reflective, grayish and semitransparent. If a more strongly reflective storage material is desired, the metal layer thickness and thus the optical density (OD) can be increased, which, however, results in a noticeable reduction of the absorption and thus a significant increase in the laser power (radiation intensity) required for writing the point distribution. High laser powers, however, are available only to a limited extent or are associated with high costs.

Even if low transmittance is necessary, for example in order to reduce disturbing stray-light influences from the rear of the storage material during reflective reading, the OD needs to be increased. The same is true if the storage material is intended to produce strongly diffractive structures in transmission by way of illumination (e.g. transmission holograms). In this case, the OD likewise needs to be increased. As a result, the abovementioned properties of the storage material can be achieved only to a limited degree or only at high cost.

Therefore, the invention is based on the technical problem of specifying a storage material with improved optical properties.

BRIEF SUMMARY OF THE INVENTION

This technical problem in a storage medium of the type mentioned in the introduction is solved by virtue of the fact that a non-metallic second layer is provided, that a metallic third layer is provided, that the second layer is arranged between the first and the third layer and that the first, the second and the third layer together have an overall thickness which is less than the wavelength of the radiation used for reading.

The invention has surprisingly found that on account of the described three-layer structure of first, second and third layers on the polymer film, the optical properties of the storage material as such can be adapted in a targeted manner.

It is of crucial importance here that the layer thickness of the three-layer structure is less than the wavelength of the respective radiation which is used for reading the point distribution which has been or is to be written to the storage medium. The layer thickness is preferably less than the wavelength of visible light which is typically used to write the point distribution to the storage material and to read the holograms. As a result of the low layer thickness, the three layers do not act, for electromagnetic radiation with a wavelength which is larger than the overall thickness of the three layers, like three individual layers with an overall thickness which would be significantly larger than the wavelength of the electromagnetic radiation used. The optical properties of the first, the second and the third layer cannot be assessed independently of one another with a corresponding wavelength.

A single reflectivity can nevertheless be associated with the three-layer structure. In addition, it is possible to achieve an absorption spectrum which permits writing with different laser wavelengths.

The respective metallic or non-metallic layers can also comprise in each case a plurality of partial layers, for example the first layer can comprise 3 nm aluminum and 3 nm silver. The second layer can comprise $SiO_2$ and another layer which was applied as protection against oxidation. The same is true for the third layer, since the latter can also be formed from a plurality of partial layers.

Moreover, it is not absolutely necessary for the layer structure to be applied directly onto the polymer surface (film). If the aim is to achieve an exposure effect based on utilizing thermal input into the film, additional layers arranged between film and layer structure should not be thicker than 1 µm. If an exposure effect which is largely independent of the film is utilized, the latter is really only a carrier material. In this case, any desired layer can be present between film and the layer structure.

It is particularly preferred if the overall thickness of the first, the second and the third layer together is less than 350 nm and thus less than the wavelength of visible light. It is even further preferred if the layers together are thinner than 150 nm. In this case, the preferred properties not only for electromagnetic waves with a wavelength in the range of visible light, but also for shorter wavelengths can be utilized. The properties of the storage material are, with overall layer thicknesses of less than 150 nm, additionally particularly expedient on the one hand, and can, on the other hand, be set within wide ranges.

A preferred embodiment of the storage material may provide for the first layer and the third layer to have an uneven layer thickness. In this case, different properties can be achieved in the first and in the third layer, even if they are made of the same material. Additionally, further properties can be achieved in a targeted manner by way of dimensioning the second layer.

In terms of the absorption, it is the case in principle for metals as a function of the wavelength that there is an absorption maximum at layer thicknesses of between 2.5 nm and 10 nm, preferably between 5 nm and 8 nm. If the first or the third layer has a thickness which is within this range, this layer ensures high absorption of the storage material. The respective other layer of the first or the third layer can in this case have a different property, since it is thicker or thinner than the first-mentioned layer.

It is particularly preferred, even if not necessary, for the first layer to be thinner than the third layer, in particular if the radiation is incident from the side of the polymer film. In that case, for example the writer beam can be absorbed in the first layer to a high degree, whereas that portion of the radiation which penetrates the first layer is nearly completely reflected at the third layer which is thicker and thus preferably has a higher OD. As a result, a storage material with both high absorption and high OD is obtained, which would not be possible in storage materials with merely one metallic layer.

Owing to the high OD, any undesired stray-light influences can be avoided in order to produce, for example, highly diffractive structures in transmission for so-called transmission holograms. Also when reading such transmission holograms, the radiation is preferably incident from the side of the polymer film. In addition, a high OD can also ensure a reflective three-layer structure. An OD of 1.9 to 3 and more can easily be achieved with the three-layer structure. At the same time, the transmitted portion of the radiation can be reduced to less than 0.1% with the three-layer structure. Here, the absorption is preferably within the range of 20% and the reflection within the range of 80%.

It is, however, also possible by way of the three-layer structure of the first, the second and the third layer to generate other properties of the storage material. If, for example, the first and the third layer are provided in a thickness at which the absorption is very high, this results in absorption properties which are very much higher, for example twice as high, than for storage materials with only one metallic layer. As a result, the storage material can be written to very easily with a low, for example half the, intensity of the writing beam.

If a high OD is now to be achieved in addition, a fourth non-metallic and a fifth metallic layer can be provided, wherein the fourth layer insulates the third and the fifth layer with respect to one another and wherein the fifth layer is thicker or thinner than the first and the third layer, in order to ensure a high OD.

In particular if the desired properties cannot be set with the three-layer structure, it is therefore possible to add further layers. Here, the general sequence of the structure, where non-metallic layers and metallic layers alternate, is maintained. Preferably, three, five, seven etc. layers are thus arranged on the polymer film.

In a preferred storage material, the first layer can therefore have a layer thickness of between 2.5 nm and 10 nm. Additionally or alternatively, the third layer can also have a layer thickness of between 2.5 nm and 10 nm, where it can be particularly preferred if the first or the third layer has a layer thickness of from 5 nm to 8 nm. The respective other layer, that is to say the third or first layer, can in this case have for example a layer thickness of between 10 nm and 100 nm in order to ensure a high OD. In principle, however, the first and the third layer can also have in each case the last-mentioned low layer thickness.

In the metallic layers, the absorption is in principle at maximum at a specific thickness and decreases as the thickness decreases or increases. Since the maximum is usually at low thicknesses, it can be advantageous for reasons of manageability if the layers which are not meant to have very high absorption are designed to be rather thicker than thinner. With increasing thickness of the metallic layer, however, the latter also becomes more silver and brighter, while metallic layers within the range of the absorption maximum can have a silverish-gray effect. At the same time, however, these layers generally have a low OD.

In order to achieve a larger OD, the layer thickness of the metallic layer must be increased or decreased starting from the absorption maximum. In the same way, for layer thicknesses which are significantly larger than the absorption maximum, the sensitivity is greater than in the case of thinner layer thicknesses, in particular within the range of the absorption maximum. Sensitivity is understood here to mean how high the likelihood is of a qualitatively good illumination of a transmission hologram.

The matter of which layer thicknesses in particular lead to a storage material having the desired properties depends very strongly on the requirements of the individual case. The three-layer structure however in each case enables very many degrees of freedom for a targeted adaptation of the storage material. If the degrees of freedom are not sufficient, any desired number of further layers can be supplemented, wherein non-metallic and metallic layers preferably alternate.

In terms of the second layer, it is preferred in principle if the latter is so thin that the three-layer structure as such remains smaller than a predetermined value such as approximately 350 nm or 150 nm. Good results have been achieved with overall thicknesses of the three-layer structure of approximately 110 nm.

In principle, the absorption of the storage material increases as the thickness of the non-metallic layer or layers increases, with the result that the storage material appears darker as the layer thickness increases. For very large layer thicknesses of the non-metallic layer or layers, the storage material is colored, whereas it remains colorless in the case of lower layer thicknesses. Together with the layer thicknesses of the second layer or of the non-metallic layer or layers, the sensitivity of the storage material also increases. Tests have shown that layer thicknesses of the second layer of between 20 nm and 80 nm are advantageous for a series of technical applications.

A fundamental limitation in terms of the materials used for the first, the second and the third layer or the metallic layer or layers does not exist. However, it has been found that simple production and processing with low costs can be achieved if the first and the third layer is made of aluminum. It can also be advantageous if the first layer or the third layer or the first and the third layer is/are made of copper, gold, silver, platinum or titanium. The second layer can be made of any material which is not electrically conducting and at least semi-transparent.

Silicon dioxide ($SiO_2$) has been found to be preferred for the second layer. In any case, the non-metallic material, however, is at least semi-transparent and not conducting, so that it can act as a dielectric between the metallic layers.

The polymer film should be at least semi-transparent for the radiation for writing and reading of the information. Preferred in this case is in particular a film made of polyethylene terephtalate (PET). Polycarbonate (PC) can also be expedient as the material for the polymer film. The film is, with particular preference, stretched, wherein monoaxial or biaxial films can be used.

In addition to the previously individually mentioned metallic and non-metallic layers, of course other layers can also be provided. These are, however, preferably arranged on that side which faces away from the polymer film in order not to negatively influence the writing or the reading of information. It is conceivable in this context for example that an adhesive layer is applied in order to apply the storage material to a substrate. The latter may be a product, packaging, a document or the like.

Alternatively or additionally, it would also be possible to apply a lacquer or the like in order to shape the optical appearance of the storage material at least from this side as desired.

BRIEF DESCRIPTION OF THE DRAWINGS

The invention will be further explained below using exemplary embodiments, with reference being made to the attached drawing, in which.

DETAILED DESCRIPTION OF THE INVENTION

Figure 1:
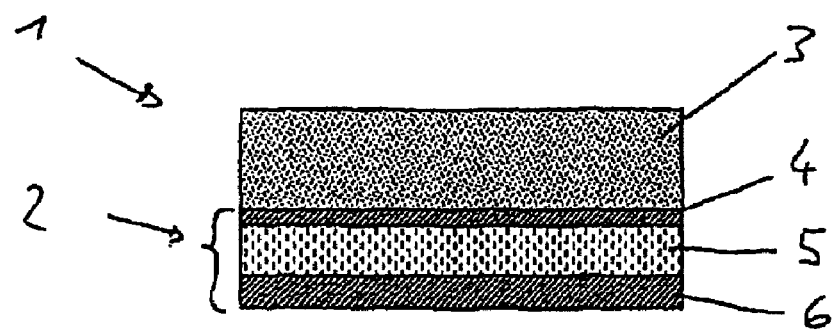
FIG. 1 schematically shows a first exemplary embodiment of the storage material according to the invention, FIG. 2 schematically shows a second exemplary embodiment of the storage material according to the invention and FIG. 3 schematically shows a third exemplary embodiment of the storage material according to the invention.

FIG. 1 shows the principle structure of a storage material 1, previously referred to as three-layer structure 2, since the polymer film 3, which preferably provides the mechanical properties of the storage material 1 owing to its significantly higher layer thickness, has three further layers 4, 5, 6. For the purposes of better illustration, the ratios between the layer thicknesses of the individual layers are not reproduced to scale. Rather, in particular the polymer film 3 is in reality very much thicker relative to the three-layer structure 2.

A first metallic layer 4 is arranged on the polymer film 3, on top of that a second non-metallic layer 5 and finally a third layer 6 which is again metallic. Here, the overall thickness of the first layer 4, the second layer 5 and the third layer 6 is together approximately 110 nm. The first layer 4 is approximately 5 nm or 6 nm thick since there is an absorption maximum here. The second layer 5 is not thicker than 80 nm and not thinner than 20 nm. The third layer 6 is, in this exemplary embodiment, thinner than the second layer 5 and has a thickness of between 15 nm and 50 nm. Both metallic layers 4, 6 are made of aluminum, whereas the non-metallic layer 5 is made of $SiO_2$.

The example of the storage material 1 shown in FIG. 1 hereinafter briefly describes the different possibilities when writing to the storage material 1. This is to be understood only as an example, however. Depending on the requirement profile of the storage material 1, different possibilities can also apply. The same is true in particular if a different layer structure is preferred. However, fundamental principles when writing to such a storage material can be illustrated in this manner.

When writing with a low beam intensity or laser power, the first layer 4, in which the absorption of the radiation and thus the thermal input are at their maximum, can be deformed in a point-wise manner. If this deformed layer is subsequently irradiated, for reading purposes, with a weaker beam, a so-called phase hologram is obtained.

If the beam intensity during writing is increased, holes may appear in the first layer 4, by means of which an amplitude hologram is formed in transmission and an amplitude hologram or phase hologram is formed in reflection.

If the radiation energy is increased further, the third layer 6 can additionally be deformed in a point-wise manner such that, from the side of the polymer film 3, an amplitude hologram or phase hologram can be obtained and, from the opposite side, an amplitude hologram or phase hologram in each case can be obtained in reflection. However, amplitude transmission holograms can also be provided if the beam intensity is chosen to be so high that the first and the third layers 6 are "perforated".

Figure 2:
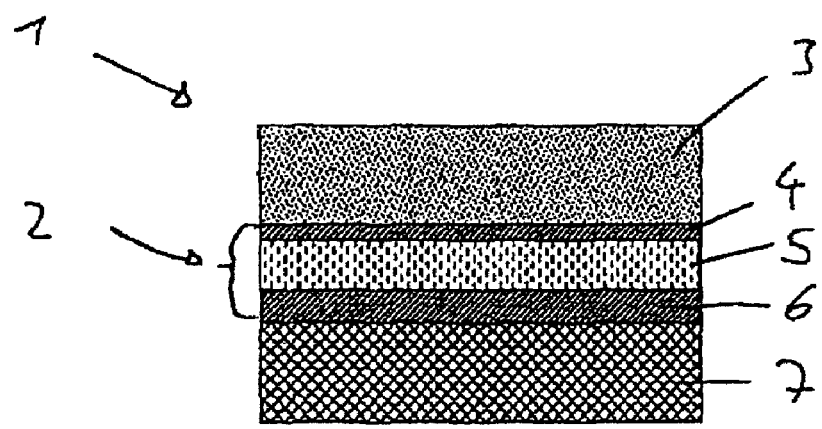

In the exemplary embodiment illustrated in FIG. 2, in addition to the three-layer structure 2 which corresponds to that in FIG. 1, an additional adhesive layer 7 is provided, which can be bonded, if required, to a substrate on which the storage material 1 is meant to be present.

Figure 3:
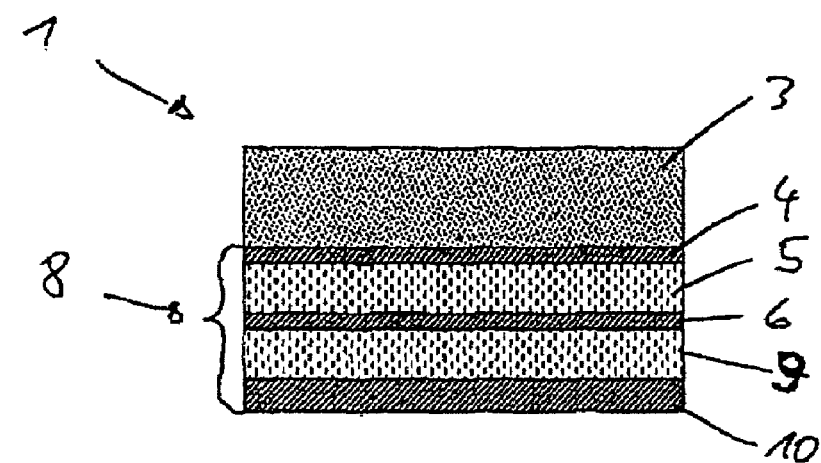

In the storage material 1 illustrated in FIG. 3, a five-layer structure 8 is provided on the polymer film 3, wherein the first layer 4 and the second layer 5 have a thickness of approximately 5 nm or 6 nm. Due to the non-metallic fourth layer 9, the fifth layer 10 is spaced apart from the third layer 6. The fifth layer 10 has a thickness of at least 15 nm. Due to the first layer 4 and the third layer 6, the storage material 1 has high absorption and, due to the fifth layer 10, it also has a high optical density (OD).

It is evident that the layer thicknesses can also be matched individually to the required properties of the storage material in a different manner, and can also be supplemented, if required, by further non-metallic and/or metallic layers. In principle, however, the attempt should be made to manage with as few layers as possible, that is at least three layers.

The invention claimed is:

1. A holographic storage material (1), comprising
   a polymer film (3),
   a metallic first layer (4),
      wherein the metallic first layer (4) is arranged directly or indirectly on the polymer film (3),
   a non-metallic second layer (5),
   a metallic third layer (6),
      wherein the second layer (5) is arranged between the first layer (4) and the third layer (6), and the first layer (4), the second layer (5) and the third layer (6) together have an overall thickness of less than the wavelength of the radiation used for reading, and
      wherein the first layer (4), the second layer (5) and the third layer (6) together have an optical density (OD) of from 1.9 to 3.

2. The storage material as claimed in claim 1, wherein the first layer (4), the second layer (5) and the third layer (6) together have an overall thickness of less than 350 nm.

3. The storage material as claimed in claim 2, wherein the first layer (4), the second layer (5) and the third layer (6) together have an overall thickness of less than 150 nm.

4. The storage material as claimed in claim 1, wherein the first layer (4) is thinner than the third layer (6).

5. The storage material as claimed in claim 1, wherein the first layer (4) has a layer thickness of between 2.5 nm and 10 nm.

6. The storage material as claimed in claim 1, wherein the second layer (5) has a layer thickness of between 10 nm and 200 nm.

7. The storage material as claimed in claim 1, wherein the third layer (6) has a layer thickness of between 10 nm and 100 nm.

8. The storage material as claimed in claim 1, wherein the third layer (6) has a layer thickness of between 2.5 nm and 10 nm.

9. The storage material as claimed in claim 1, wherein the first layer (4) and the third layer (6) are in each case an aluminum layer.

10. The storage material as claimed in claim 1, wherein the second layer (5) comprises $SiO_2$.

11. The storage material as claimed in claim 1, wherein the first layer (4), the second layer (5) and the third layer (6) together have a transmittance of less than 0.1%.

12. The storage material as claimed in claim 1, wherein the polymer film (3) is a stretched polymer film.

13. The storage material as claimed in claim 1, wherein the polymer film (3) is made of polyethylene terephtalate (PET).

14. The storage material as claimed in claim 1, wherein an adhesive layer (7) for applying the storage material (1) to a substrate is provided on the third layer (6).

15. The storage material as claimed in claim 1, wherein a non-metallic fourth layer (9) is arranged on the third layer (6).

16. The storage material as claimed in claim 15, wherein a metallic fifth layer (10) is arranged on the fourth layer (9).

17. The storage material as claimed in claim 15, wherein
   the metallic first (4), the metallic third layer (6), the metallic fifth layer (10) and non-metallic layers (5, 9) are arranged on the polymer film (3) and
   the metallic layers (4, 6, 10) and the non-metallic layers (5, 9) are always arranged one on top of the other in an alternating manner.

* * * * *